United States Patent [19]
Potin

[11] 3,711,930
[45] Jan. 23, 1973

[54] PROCESS AND DEVICE FOR MAKING SLIDE FASTENERS

[75] Inventor: Marcel Potin, Choisy-le-Roi, France

[73] Assignee: Societe Financiere Francaise de Licences et Brevets, Choisy-le-Rois, France

[22] Filed: June 8, 1971

[21] Appl. No.: 150,992

[30] Foreign Application Priority Data

June 12, 1970 France.................................7021637

[52] U.S. Cl...................................29/408, 29/207.5
[51] Int. Cl.........................B23p 11/00, B23p 19/04
[58] Field of Search ...29/207.5 R, 408, 207.5 D, 410

[56] References Cited

UNITED STATES PATENTS 3,611,538  10/1971  Takamatsu.......................29/207.5 D

*Primary Examiner*—Thomas H. Eager
*Attorney*—Arthur B. Colvin

[57] ABSTRACT

A process for the preparation of continuous fastener chain in the form of a strip comprises two rows of linking components fixed by stitching to their backing tapes, for the making of slide fasteners of specific lengths, by removing the linking components from areas separated longitudinally from one another and corresponding to the spaces required between two neighboring fasteners, said process comprising the steps of providing a tool equipped with a cutting edge and activated by ultrasonic vibrations transmitted by a generator of such vibrations, moving a fastener chain beneath said tool with the cutting edge of said tool being positioned perpendicularly to the axis of said chain, applying said tool to said chain at intervals in time and for periods of time so as first of all to make a transversal cut through the two rows of linking components of the chain and thereafter to lift and detach the ensuing portion of these two rows by cutting the sewing threads of this portion which is then cut at the opposite end.

7 Claims, 7 Drawing Figures

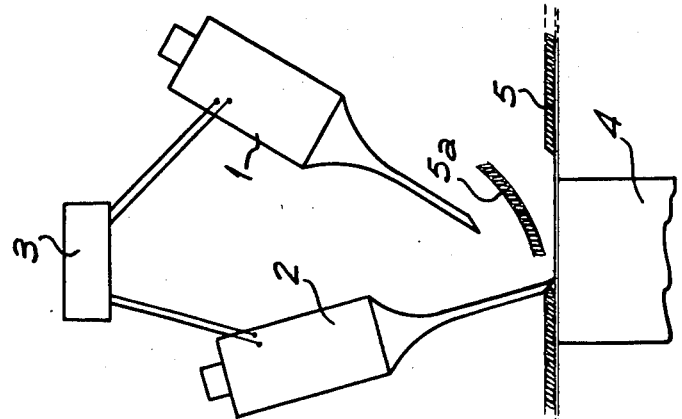
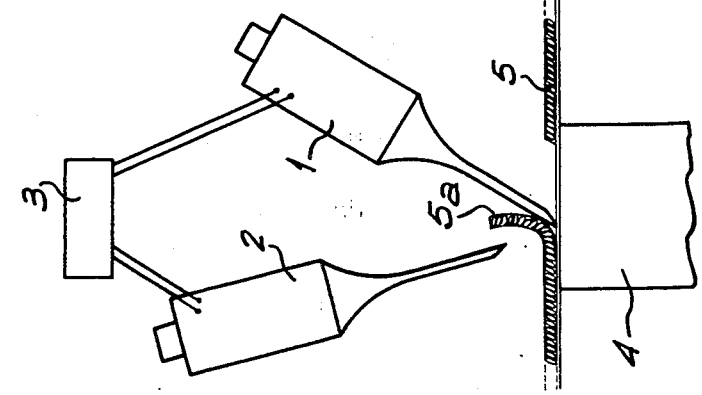
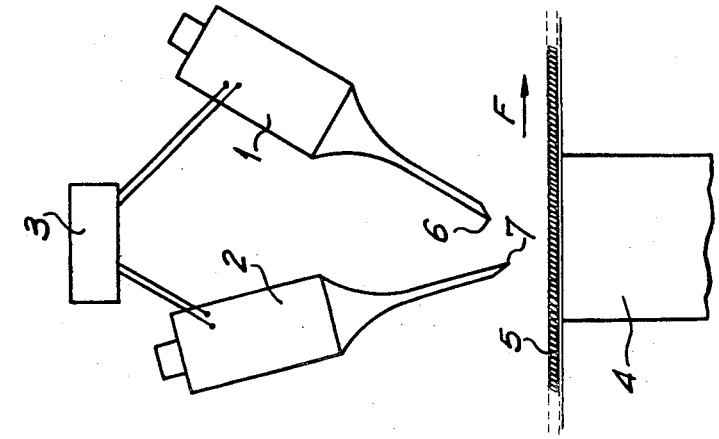
INVENTOR
MARCEL POTIN

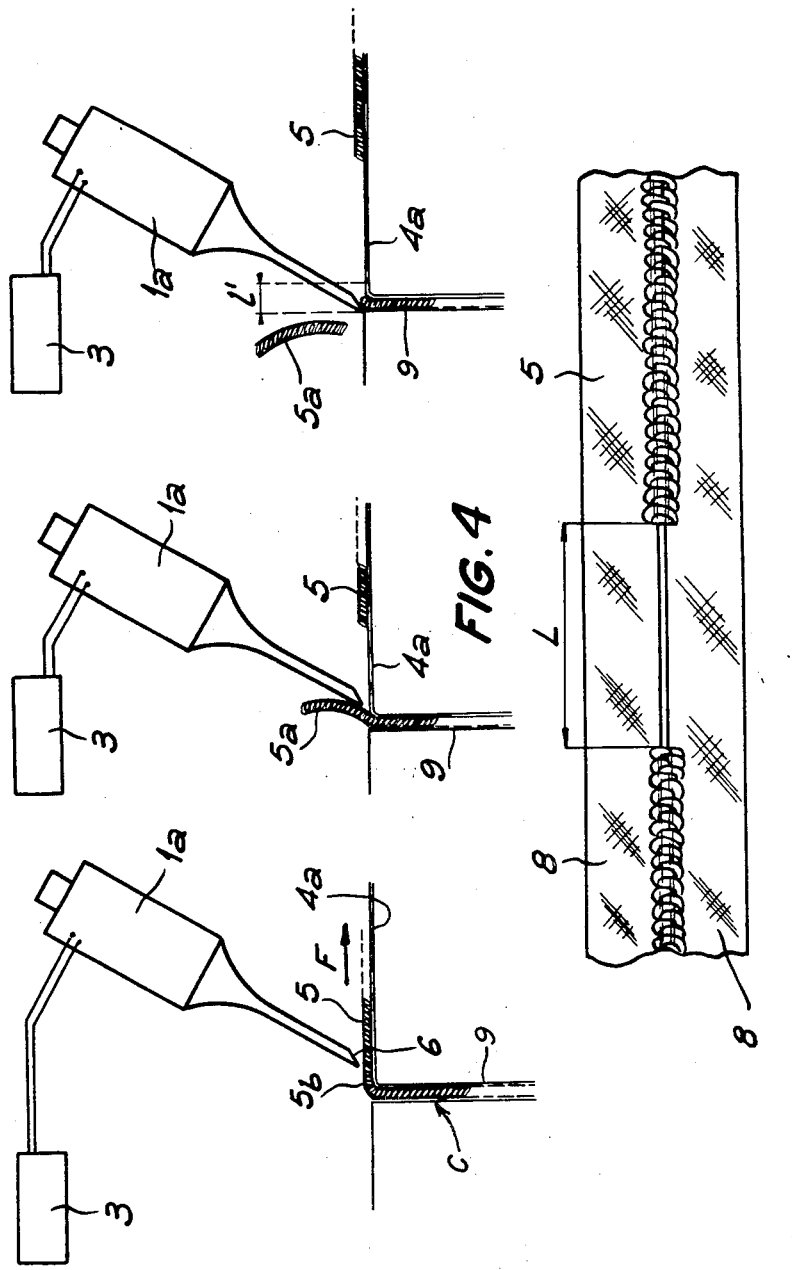

PROCESS AND DEVICE FOR MAKING SLIDE FASTENERS

This invention relates to the manufacture of slide fasteners from a continuous chain of fasteners, i.e. a strip comprising two rows of linking components fixed by stitching onto their backing tapes.

More specifically, the invention relates to a process and a device for the preparation of a chain of fasteners of this kind with a view to making slide fasteners of specific lengths, by removing the linking components from areas separated from one another, corresponding to the required spaces between two neighboring fasteners.

This technique is currently used for the manufacture of fasteners whose linking components are made up, in each row, of a continuous thread shaped into a spiral or coil. When making fasteners of this kind, the first step is to make very long rows of linking components, without any break other than those caused by a break in the continuity of the raw materials used, or a momentary stoppage of the manufacturing machinery. Then, two rows are fixed on two backing tapes, generally by means of stitching. After linking these two rows, a continuous fastener chain is obtained which can subsequently be cut into successive portions to make fasteners of a specific length.

In order to finish these, it is then sufficient to engage a slide on each portion of fastener and add end pieces to each end of these various portions. However, in order to do this, it is necessary for the ends of the latter to be free from linking components. This is why, before cutting the continuous chain into successive portions, the linking components are removed from the areas corresponding to the spaces required between two neighboring fasteners.

Clearing these spaces thus makes it possible subsequently to finish the different fasteners. However, these spaces also have the advantage of delimiting the various portions of chain which will constitute the fasteners. Moreover, it should be noted that, for some users, notably garment manufacturers, slide fasteners are very often supplied in the form of a continuous chain in which the two rows of linking components nevertheless comprise gaps corresponding to the spaces required between two neighboring fasteners. These gaps then enable the user to place the slide on each portion, then to cut apart two fasteners of specific lengths, and eventually to fold back the ends of the backing tapes inside the articles fitted with such fasteners, e.g. garments, the ends in question then being devoid of any linking components.

Various mechanical processes, making it possible to move the linking components from the spaces between the successive fasteners which will be cut out of a continuous strip, are already known. However, these processes are not entirely satisfactory. In fact, they do not make it possible to remove completely the required portions of the spiral or windings corresponding to the parts which are to be removed. Generally, these processes leave portions of whorls or windings imprisoned in the stitching fixing each row of linking components to the corresponding backing tape. Moreover, other processes used at present have the disadvantage of fraying the seams or the tapes.

The process and the device of this invention are however arranged so as to obtain absolutely complete removal of rows of linking components from the areas which are to be stripped, as well as removal of the sewing threads which were fixing the corresponding whorls or windings to the backing tapes. The aim of this process and this device is to leave only bare portions of tape at the places intended for the spaces between the different fasteners, so that the finishing operations on these fasteners can later be carried out without difficulty. This also has the advantage of making the ends of the fasteners very pliable, which facilitates, where necessary, folding them back inside the articles to which they are to be fitted, e.g. garments.

In accordance with the process of the present invention, the removal of the linking components from the requisite places along a fastener chain is achieved by means of a tool equipped with a cutting edge and which is activated by ultrasonic vibrations transmitted by a generator of such vibrations.

For this purpose, the fastener chain is moved underneath this tool, whose cutting edge is positioned perpendicularly to the axis thereof, and the tool is applied to the chain at specific intervals of time and for specific periods of time, so as first of all to make a transversal cut through the two rows of linking components, then to lift and detach the ensuing portion of these two rows, made possible by cutting the seam threads of this portion, which is then cut at its opposite end.

In a particular mode of putting this process into operation, the final cutting of each detached portion is done by means of a second tool similar to the first and which is applied to the fastener chain after the later has been engaged under the end part of the portion to be detached. In another mode of putting the process of the invention into operation, the final cutting of each detached portion is done by a relative translatory movement of the edge of the working tool beyond a bend made in the fastener chain, this movement being effected when the tool has arrived under the end part of the portion to be detached.

This invention also relates to a device constructed to put the process defined above into operation. The various features and advantages of this device and the corresponding process will emerge from the following description. This is given with reference to the accompanying drawings which are given as an indication only and wherein:

FIG. 1 is a diagrammatic side elevation view of a first embodiment of the device provided for the putting into operation of the process of the invention;

FIGS. 2 and 3 are similar views of the same device showing it during two successive phases of operation of this process;

FIG. 4 is a partial view from above of a fastener chain to which the preparation process of the invention has been applied;

FIG. 5 is a diagrammatic side elevation view of a second embodiment of the device of the invention;

FIGS. 6 and 7 are similar views showing this device during two successive phases of the process of the invention.

In the embodiment shown in FIGS. 1 to 3, this device comprises two working tools 1 and 2. Each of these consists of a metal punch activated by ultrasonic vibrations transmitted to it by a generator of such vibrations.

These two tools are positioned some distance above a fixed table or similar unit whose top surface 4 is used as a support for the continuous fastener chain 5 which is to undergo the preparation process of the invention.

For this purpose guide means, e.g. a channel, are provided in the top surface of this support. Moreover, this device comprises driving means imparting a continuous translatory movement to the chain 5 in the direction of the arrow F.

The punches constituting the two working tools 1 and 2 end in a cutting edge 6 or 7 respectively. The siting of these two tools is such that this edge is positioned perpendicularly to the axis of movement of the fastener chain 5. Preferably, the bottom part of the two working tools is spade shaped.

Moreover, as can be seen from the drawings, the first working tool 1 slants downwards in the opposite direction to that in which the fastener chain 5 moves. Conversely, the second tool 2 slants in the reverse direction.

This device also comprises driving means 3 capable of controlling, at specific intervals of time, the movement of the two tools 1 and 2 in the direction of the fastener chain 5. The arrangement is such that the first tool 1 is applied to the later and brought into the position shown in FIG. 2 when the place for a space between two fasteners comes opposite the working tools. Because of this movement, the edge 6 of this tool makes a transversal cut through the two rows of linking components of the chain 5. This results from the fact that this tool is activated by ultrasonic vibrations. Due to the latter, the edge 6 of this tool exercises a mechanical shearing action on the threads shaped in a spiral or winding which make up the two rows of linking components. However, this mechanical action is accompanied by heating of the thermoplastic material which makes up these threads. This heating is also due to the ultrasonic vibrations which activate the working tool.

The portion 5a of the two rows of linking components which is above the working tool is thus detached from the lower part of the fastener chain. However, because the latter continues its forward movement in the direction of the arrow F, this portion is then lifted by the bottom end of the tool 1, as shown in FIG. 2. During this operation, the edge 6 of this tool, due to the ultrasonic vibrations, cuts all the sewing threads which until then were fixing this portion to the two backing tapes. In fact, the tool 1 is kept for a certain time in such a position that its bottom edge 6 is immediately above the surface of the two backing tapes. In this connection, it should be noted that the slant given to this tool serves a useful purpose during this operation. After a certain time, corresponding to the required length of the space, the controls of the first working tool raise the latter into the position shown in FIG. 3. But at the same time the second tool 2 is brought into its working position as shown in the same figure. Its movement causes its bottom edge 7 to make a transversal cut through the two rows of linking components, as was the case previously with the first tool. Now, the effect of this second cut is completely to detach the section 5a from the two rows of linking components.

However, this section is detached with all the bits of sewing thread which were previously fixing it to the backing tapes 8. In these circumstances, the corresponding portion L of the latter is completely bared.

The portion 5a so detached can be removed from the device by any suitable means, e.g. a jet of compressed air.

When the two working tools have been brought back to their initial position, the fastener chain 5 continues its forward movement for a space of time which depends on the length required for the fastener to be made. When the opposite end of this fastener has arrived opposite the two tools in this device, the first of these again comes down into its working position and the process described above is repeated, and so on.

This device thus enables the preparation process covered by the invention to be put into operation usefully. However, this process can also be applied by means of any other suitable device, e.g. the one shown in FIGS. 5 to 7.

This comprises a single working tool 1a, identical to tool 1 provided in the previous embodiment. However, the channel C provided to guide the fastener chain 5 is arranged so as to make a bend as at 5b in the latter, a short distance above from the position of the bottom edge 6 of the working tool. For this purposes, this channel comprises a vertical slot 9 in support 4a, the slot extending at right angles to the surface of said support. Moreover, the support 4a in which the channel is positioned is movably mounted so as to be able to move in the direction of the arrow F and in the opposite direction.

The cutting and lifting of each portion to be detached is carried out as before by the working tool 1a (see FIG. 6). But when this tool has arrived underneath the end of the portion 5a to be detached, the cut is made by means of a translatory movement of the support 4a of the fastener chain 5 in the direction of the arrow F. This support moves a short distance L, sufficient for the bottom edge of the tool 1a to be thenceforth below the bend 5b formed by the fastener chain (see FIG. 7).

This relative translatory movement of the bottom edge 6 of this tool against the corresponding edge of the upper part 9 of the guiding channel for the fastener chain produces a shearing effect which makes a transversal cut through the two rows of linking components. The portion 5a is thus completely detached from the fastener chain, and as before, it is then removed with the sewing threads which were previously fixing it to the backing tapes. In either case, these two tapes are thus bared in the place for each space required between two successive fasteners.

It should be noted that this result is obtained without stopping the continuous forward movement of the chain 5. Consequently, the process and the device of the invention make very fast working rates possible. However, their main advantage is obviously the face that the two backing tapes of the fastener chain are completely bared at the required places.

I claim:

1. A process for the preparation of a continuous fastener chain in the form of a strip comprising two rows of linking components fixed by stitching to their backing tapes, for the making of slide fasteners of specific lengths, by removing the linking components from areas separated longitudinally from one another and corresponding to the spaces required between two neighboring fasteners, said process comprising the steps of providing a tool equipped with a cutting edge and activated by ultrasonic vibrations transmitted by a generator of such vibrations, moving a fastener chain beneath said tool with the cutting edge of said tool being positioned perpendicularly to the axis of said chain, applying said tool to said chain at intervals in time and for periods of time so as first of all to make a transversal cut through the two rows of linking components of the chain and thereafter to lift and detach the ensuing portion of these two rows by cutting the sewing threads of this portion which is then cut at the opposite end.

2. A process, as claimed in claim 1, wherein the final cutting of each detached portion is effected by means of a second tool similar to the first and which is applied to the fastener chain when the first tool is engaged under the end part of the portion to be detached.

3. A process, as claimed in claim, 1 wherein the final cutting of each detached portion is effected by means of a relative translatory movement of the edge of the working tool beyond a bend made in the fastener chain, said translatory movement being imparted to the tool when it has arrived under the end part of the portion to be detached.

4. A device for carrying out the process claimed in claim 1, comprising in combination a tool equipped with a cutting edge and activated by ultrasonic vibrations transmitted by a generator such vibrations, means for guiding and driving a fastener chain so that said chain moves beneath said tool perpendicularly to the cutting edge thereof, and means for moving said tool so that it can be applied to the fastener chain and then moved away.

5. A device, as claim in claim 4 and for carrying out the process of claim 2, comprising further a second similar working tool and means for moving said second tool so that it can be applied to the fastener chain when said first tool has arrived under the end part of the portion to be detached.

6. A device, as claimed in claim 4 and for carrying out the process of claim 3, wherein the means for guiding the fastener chain cause a bend to be made in the latter a short distance from the position of the working tool, and wherein driving means are provided so that this tool effects a relative movement beyond said bend when it has arrived under the end part of the portion to be detached.

7. A device, as claimed in claim 6, wherein said relative movement is produced by a translatory movement of the unit guiding the fastener chain.

* * * * *